United States Patent Office 3,786,144
Patented Jan. 15, 1974

3,786,144
1-POLYFLUOROALKYL BENZODIAZEPINES TO TREAT ANXIETY
Martin Steinman, Livingston, N.J., assignor to Schering Corporation, Bloomfield, N.J.
No Drawing. Original application Feb. 13, 1970, Ser. No. 11,336, now Patent No. 3,723,414. Divided and this application Dec. 8, 1972, Ser. No. 313,219
Int. Cl. A61k 27/00
U.S. Cl. 424—244                12 Claims

ABSTRACT OF THE DISCLOSURE

Disclosed herein are 1-(polyfluoroalkyl)-2,3-dihydro-5-aryl-1H-1,4-benzodiazepines and compounds useful as intermediates for preparing these benzodiazepines. These benzodiazepines are particularly useful as anti-anxiety agents.

---

This application is a division of my copending application Ser. No. 11,336 filed Feb. 13, 1970 now U.S. Pat. 3,723,414.

This invention relates to chemical compounds which may be considered generically as 1-(polyfluoroalkyl)-2,3-dihydro-5-aryl-1H-1,4-benzodiazepines and to intermediates for their preparation. In another aspect, this invention also relates to processes for making and using such compounds. These compounds beneficially affect mammalian central nervous systems and in particular, are useful as anti-anxiety agents, sedatives, muscle relaxants and anti-convulsants.

The compounds of this invention of pharmacological interest may be represented by the structural formula:

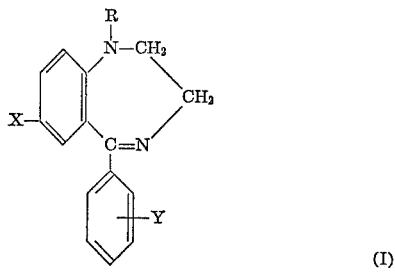

(I)

wherein X is a member of the group consisting of halogen, trifluoromethyl and nitro; Y is a member of the group consisting of hydrogen, halogen, trifluoromethyl, nitro, hydroxy, lower alkyl and lower alkoxy; and R is a polyfluoro-lower alkyl group; and the 4-N-oxides and the pharmaceutically acceptable salts thereof.

As used herein, the terms "lower alkyl" refer to both straight and branched-chain hydrocarbon radicals having up to six carbon atoms such as methyl, ethyl, propyl, isopropyl, n-butyl, t-butyl and the like. The term "lower alkoxy" includes —O-lower alkyl radicals wherein the lower alkyl moiety is as defined above, such as methoxy, ethoxy, propoxy and the like. The term "halogen" as used herein comprehends fluorine, chlorine, bromine and iodine. Chloro is the preferred X substituents and ortho-fluoro is the preferred Y substituent.

The term "polyfluoro-lower alkyl" refers to lower alkyl radicals substituted with more than one fluoro radical and includes such moieties as 2,2,2-trifluoroethyl, trifluoromethyl, 2,2,3,3,3-pentafluoropropyl and the like. In a preferred embodiment of this invention the polyfluoro-lower alkyl moiety has two alpha hydrogen atoms, i.e. $R_fCH_2$— wherein $R_f$ is polyfluoroalkyl. Most preferably, $R_f$ is trifluoromethyl, i.e. the 1-(2,2,2-trifluoroethyl) species.

The compounds may be used in the form of their therapeutically acceptable acid addition salts. Such salts include those formed in the conventional manner with both inorganic and organic acids such as hydrochloric acid, hydrobromic, nitric acid, sulfuric acid, acetic acid, formic acid, succinic acid, maleic aid, p-toluenesulfonic acid and the like.

These compounds of Formula I can be prepared according to the following reaction sequence:

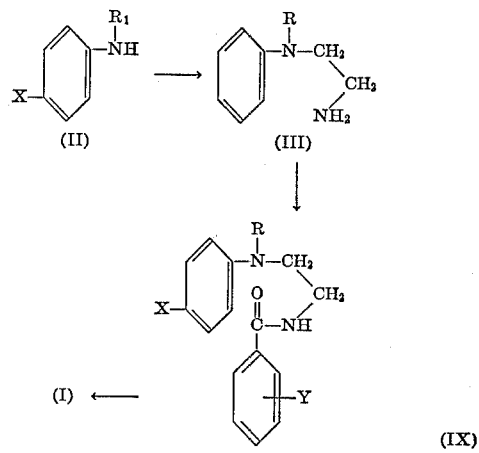

wherein X, Y and R are as above defined.

The para - substituted - N - (polyfluorolower alkyl)-anilines of Formula II may be prepared as described in U.S. Pat. 3,429,874 (see Example 10). The novel diamines of Formula III may be prepared by the Friedel-Crafts alkylation of the anilines of Formula II using ethyleneimine employing the usual Friedel-Crafts reaction techniques. Molar amounts of a suitable calatyst such as aluminum chloride or ferric chloride are employed. The resultant complex can be broken up with water, basified, and the organic components extracted with a suitable organic solvent such as methylene chloride. The organic extract is then extracted with aqueous dilute acid. The aqueous extract is then rendered basic and the desired diamines are extracted with a suitable organic solvent such as chloroform. These diamines are novel and part of the inventive concept.

The diamines of Formula III are then aroylated using suitable acylating agents in the conventional manner. Generally the desired benzoyl halide, and particularly the chloride is a preferred acylating agent. An organic solvent such as dry ether containing a tertiary amine such as triethylamine is employed for the aroylation. The desired aroylated diamine of Formula IV can then be recovered by conventional workup. These compounds are also novel and part of the inventive concept.

The aroylated diamines of Formula IV can be cyclized to the desired benzodiazepines employing standard dehydration reagents and techniques. A preferred dehydrating agent is a mixture of phosphorus pentoxide and phosphorus oxychloride. Generally, the aroylated diamines and dehydrating agent are maintained in intimate contact for several hours. The desired benzodiazepines of Formula I can then be recovered by conventional extraction techniques.

The 4-N-oxides of the compounds of Formula I may be represented by the formula

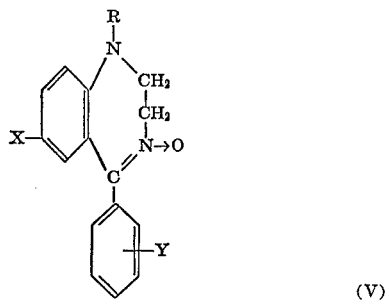

(V)

wherein X, Y and R are as above defined. These 4-N-oxides may be prepared by the controlled oxidation of the compounds of Formula I employing, for example, a peracid such as m-chloroperbenzoic acid.

The following examples illustrate the preparation of representative compounds of this invention.

EXAMPLE 1

Preparation of N-(p-chlorophenyl)-N-(2,2,2-trifluoroethyl)-ethylenediamine 84.0 grams of p-chloro-N-(2,2,2-trifluoroethyl)-aniline (0.40 mole) is added slowly to a stirred suspension of 29.3 grams of aluminum chloride (0.44 mole) and 200 ml. of dry benzene at room temperature. When the addition is complete the mixture is heated under reflux for 20 minutes, the heating is discontinued and 20.6 grams of ethyleneimine (0.48 mole) is slowly distilled into the reaction vessel. The mixture is left overnight at 50–53° C.

The mixture is cooled and poured onto 500 grams of ice. Potassium hydroxide (100 grams) is added in small portions. The organic layer is separated; the aqueous layer is extracted with methylene chloride. The organic layers are combined, concentrated, and extracted with 5% hydrochloric acid. The acid extract is made basic and extracted with chloroform. After drying with sodium sulfate the solution is evaporated to give the title compound.

EXAMPLE 2

Preparation of N-(p-chlorophenyl)-N-(2,2,2-trifluoroethyl)-N$^1$-(o-fluorobenzoyl)-ethylenediamine 10.0 grams N - (p - chlorophenyl)-N-(2,2,2-trifluoroethyl)-ethylenediamine (0.04 mole) in 40 ml. of dry ether containing 4 grams of triethylamine (0.040 mole) are stirred in an ice-bath. 8.8 grams of o-fluorobenzoyl chloride (0.056 mole) are added slowly to the cold mixture and stirred for two hours. 100 ml. methylene chloride is added and the mixture is extracted successively with 5% hydrochloric acid, water, 10% sodium hydroxide and water. The organic layer is separated, dried (with sodium sulfate) and the solvent is removed in vacuo. The material is subjected to column chromatography using 300 grams of silica gel and methylene chloride. Fractions of 500 ml. are collected and fractions 2 and 3 are evaporated to yield the product which is crystallized from methylene chloride and hexane to yield the title compound, M.P. 80–82° C.

EXAMPLE 3

Preparation of 7-chloro-2,3-dihydro-1-(2,2,2-trifluoroethyl)-5-(o-fluorophenyl)-1H-1,4-benzodiazepine 3.9 grams of N - (p-chlorophenyl)-N-(2,2,2-trifluoroethyl)-N$^1$-(o-fluorobenzoyl) - ethylenediamine (0.0104) are stirred with 17 grams of phosphorus pentoxide and 40 ml. of phosphorus oxychloride for 20 hours at 110–120° C. The mixture is cooled and treated carefully with ice and 300 ml. of 4 N hydrochloric acid. The mixture is washed with ether and made basic with 10 N sodium hydroxide.

The mixture is extracted with methylene chloride, dried over sodium sulfate, and evaporated to a residue which is crystallized from petroleum ether (B.P. 30–75° C.) to obtain the title compound, M.P. 81–83° C.

EXAMPLE 4

Preparation of 7-chloro - 2,3 - dihydro-1-(2,2,2-trifluoroethyl) - 5 - (o-fluorophenyl)-1H-1,4-benzodiazepine-4-oxide 0.1 gram of 7-chloro - 2,3 - dihydro-1-(2,2,2-trifluoroethyl) - 5 - (o - fluorophenyl) - 1H - 1,4-benzodiazepine (0.00028 mole) are dissolved in 10 ml. of 1,2-dichloroethane and then 0.06 gram of 85% m-chloroperbenzoic acid are added. The mixture is heated, with stirring, at 40–45° C. overnight, 60–65° C. for 4 hours and then refluxed for 3 hours while following the reaction with thin layer chromatography. The reaction mixture is cooled and transferred to a chromatography column containing silica gel with hexane and the mixture is eluted with ether. After all of the yellow colored material is eluted off, the silica gel is poured out, and washed with ethyl acetate. The solvent is removed in vacuo. The residue is dissolved in methylene chloride and shaken with saturated sodium bicarbonate solution and water. The methylene chloride solution is separated and dried (sodium sulfate). The solvent is removed to give the title compound, M.P. 160–162° C. which is recrystallized from methylene chloride-hexane to yield 0.08 g., M.P. 163–164.5° C.

By substituting analogous starting materials in the processes of the above examples, one can produce the other species of this invention. For example, by substituting o-chlorobenzoyl chloride or benzoyl chloride in place of o-fluorobenzoyl chloride in Example 2 one can prepare N-(p-chlorophenyl)-N-(2,2,2 - trifluoroethyl)-N$^1$-(o-chlorobenzoyl)-ethylenediamine and N - (p - chlorophenyl)-N-(2,2,2-trifluoroethyl) - N$^1$ - benzoyl-ethylenediamine, respectively. By subjecting these two diamines to the cyclization process of Example 3, one can prepare 7-chloro-2,3-dihydro-1-(2,2,2-trifluoroethyl) - 5 - (o-chlorophenyl)-1H-1,4-benzodiazepine and 7-chloro-2,3-dihydro-1-(2,2,2-trifluoroethyl) - 5 - phenyl-1H-1,4-benzodiazepine, respectively. In the same fashion, by substituting p-trifluoromethyl benzoyl chloride and m-nitrobenzoyl chloride in the reaction scheme of Examples 2 and 3, one can produce 7-chloro-2,3-dihydro - 1 - (2,2,2-trifluoroethyl)-5-(p-trifluoromethylphenyl) - 1H - 1,4-benzodiazepine and 7-chloro-2,3-dihydro - 1 - (2,2,2-trifluoroethyl)-5-(m-nitrophenyl)-1H-1,4-benzodiazepine, respectively.

Similarly, by substituting p - nitro-N-trifluoromethyl aniline in Example I, one can prepare N-(p-nitrophenyl)-N-trifluoromethyl ethylenediamine. By acylation of the latter with p-toluyl bromide one can prepare N-(nitrophenyl) - N-trifluoromethyl-N$^1$-(p-toluyl)-ethylediamine which can be cyclized to 7-nitro-2,3-dihydro-1-trikuorometuyl-5-(p-toluyl)-1H-1,4-benzodiazepine. In the same manner, by substituing p - triffuoromethyl-N-(2,2,3,3,3-pentafluoropropyl)-aniline in Example I, one can prepare N - (p - trifluoromethyl-N-(2,2,3,3,3-pentafluoropropyl)-ethylenediamine.

Upon acylation of this species with m-anisoyl chloride one can prepare p-trifluoromethyl-N-2,2,3,3,3-pentafluoropropyl)-N$^1$-(m-anisoyl)-ethylenediamine which yields upon cyclization 1 - trifluoromethyl-2,3-dihydro-1(2,2,3,3,3-pentafluoropropyl-N$^1$-(m-anisoyl)-1H-1,4-benzodiazepine.

The tangible embodiments of this invention exert an effect on the mammalian central nervous system as determined by standard pharmacological evaluation and as such are useful as tranquilizer or anti-anxiety agents. Additionally they exhibit valuable anti-convulsant and muscle relaxant properties. In pharmacological testing there has been observed significant differentials between transquilizing and muscle-relaxing doses and doses which cause neurological impairment, e.g. ataxia. The therapeutic ratio is significantly higher in the compounds of this invention than that observed in analogous compounds presently known in the art.

Based upon standard laboratory investigative procedures such as the Antagonism of Pentylene Tetrazole, Everett and Richard, J. Pharm. and Exp. Ther., vol. 81, p. 402 (1944) and Antogonism of Maximal Electro-Shock-Induced Seizures in Mice, Synward, E. A., et al., J. Pharm. and Exp. Ther., vol. 106, p. 319 (1952) for anti-convulsant activity, the Central Nervous System Actiivty and Acute Toxicity, Irwin, Science 136, p. 123 (1962) for muscle relaxant and sedative-hypnotic activities, and Antagonism of Foot-Shock Induced Fighting in Mice, Tedeschi, et al., J. Pharm. and Exp. Ther., vol. 125, p. 28 (1959) and Taming Activity in Monkeys, Randall, Diseases of the Nervous System, vol. 21, p. 7 (1960) for anti-anxiety activity, it is found that when used as an anti-anxiety agent the dosage range is about 0.1–5 mg./kg. of body weight per day, preferably administered orally in divided dosages. When used as an anti-convulsant the dosage range is about 2–30 mg./kg. of body weight per day, preferably orally administered in divided doses. When used as a muscle relaxant the dosage range is about 0.1–1.5 mg./kg. of body weight per day, preferably orally administered in divided doses. When used as a sedative-hypnotic the dosage range is about 3–10 mg./kg. of body weight preferably orally administered in a single dose.

The compounds of this invention may be administered alone or combined with other medicaments. In any event, a suitable pharmaceutically acceptable carrier is generally employed. A carrier is selected according to the route of administration to be used as well as according to the physical properties of the compounds and standard pharmaceutical practice. It should not react chemically with the compound to be administered. In a preferred embodiment the compositions of this invention are administered orally, although parenteral and topical administration are also contemplated. The preparations containing the active ingredients of this invention may be in the form of tablets, capsules, syrups, elixirs, suspensions, ointments, creams and the like.

In the formulations of pharmaceutical preparations there can be employed such pharmaceutically acceptable diluents, as for example, water, gelatin, lactose, starches, magnesium stearate, talc, vegetable oils, gums and petroleum jelly. The following examples show typical tablet and capsule formulations incorporating the tangible embodiments of this invention. The formulations are illustrative merely and no limitation is intended.

TABLET FORMULATIONS (I) Formula and method of manufacture for 7-chloro-1-(2,2,2 - trifluoroethyl)-2,3-dihydro-5-(o-fluorophenyl)-1H-1,4-benzodiazepine Coated tablets:                                       Mg./core
  7 - chloro - 1-(2,2,2-trifluoroethyl)-2,3-dihydro - 5 - (o-fluorophenyl)-1H-1,4-benzodiazepine _____ 100.0
  Lactose, USP _____ 123.0
  Dicalcium phosphate _____ 70.0
  Sodium lauryl sulfate _____ 15.0
  Polyvinylpyrrolidone _____ 15.0
  Water, 50 ml./1000 cores.
  Corn starch _____ 30.0
Dry:
  Sodium lauryl sulfate _____ 3.0
  Magnesium stearate _____ 3.0
                                                      _____
  Tablet weight _____ 359.0

Procedure: The 7-chloro-1-(2,2,2-trifluoroethyl)-2,3-dihydro-5-(o-fluorophenyl)-1H-1,4-benzodiazepine is mixed with the lactose, dicalcium phosphate, and sodium lauryl sulfate. The above mixture is screened through a No. 60 screen and granulated with an aqueous solution containing polyvinylpyrrolidone. Add additional water, if necessary, to bring powders to a pasty mass. Add corn starch and continue mixing until uniform granules are formed. Pass through a No. 10 screen, tray and dry in oven at 100° C. for 12–14 hours. Reduce dried granulation through a No. 16 screen, add sodium lauryl sulfate and magnesium sulfate, mix and compress into desired shape on a tablet machine.

Coating: The above cores are treated with a lacquer and dusted with talc to prevent moisture absorption. Sub-coat layers are added to round out the core. A sufficient number of lacquer coats are applied to make the core enteric. Additional sub-coats and smoothing coats are applied to completely round and and smooth the tablet. Color coats are applied until desired shade is obtained. After drying, the coated tablets are polished to give the tablets an even gloss.

(II) Capsule formulations

Formula:                                           Mg./capsule
  7 - chloro - 1-(2,2,2-trifluoroethyl)-2,3-dihydro - 5 - (o-fluorophenyl)-1H-1,4-benzodiazepine _____ 100.0
  Sodium lauryl sulfate _____ 20.0
  Lactose _____ 279.0
  Magnesium _____ 101.0
                                                      _____
                                                      500.0

Procedure: Mix together 7-chloro-1-(2,2,2-trifluoroethyl) - 2,3 - dihydro-5-(o-fluorophenyl)-1H-1,4-benzodiazepine, sodium lauryl sulfate and lactose. Pass through a No. 80 screen. Add magnesium stearate, mix and encapsulate into the proper size 2 piece gelatin capsule.

(III) Suppository

Formula:                                              Mg./2 gs.
  7 - chloro - 1-(2,2,2-trifluoroethyl)-2,3-dihydro-5 - (o - fluorophenyl)-1H-1,4-benzodiazepine, micronized _____ 100
  Theobroma oil, pharm. grade to make 2 gms.

Method of preparation: Prepare a slurry of the 7-chloro - 1 - (2,2,2-trifluoroethyl)-2,3-dihydro-5-(o-fluorophenyl)-1H-1,4-benzodiazepine with a portion of the melted theobroma oil to bring the batch to final weight. Pour the melted mix, while maintaining uniformity, into appropriately prepared molds and allow to cool.

Numerous variations of the above compositions of matter and processes for the manufacture will be apparent to one skilled in the art within the spirit of the present invention.

What is claimed is:

1. A method of treating anxiety comprising administering to a mammal exhibiting anxiety, an amount effective to reduce anxiety of a compound of the structural formula:

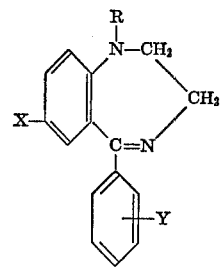

wherein $X$ is a member of the group consisting of halogen, trifluoromethyl and nitro; Y is a member of the group consisting of hydrogen, halogen, trifluoromethyl, nitro, hydroxy, lower alkyl and lower alkoxy; and R is 2,2,2-trifluoroethyl; or the 4-N-oxide or a pharmaceutically acceptable acid addition salt thereof.

2. A method according to claim 1 wherein X is halogen.

3. A method according to claim 2 wherein Y is ortho-fluoro.

4. A method according to claim 2 wherein X is chloro.
5. A method according to claim 1 wherein Y is ortho-fluoro.
6. A method according to claim 5 wherein said compound is 7-chloro-2,3-dihydro-1-(2,2,2-trifluoroethyl)-5-(o-fluorophenyl)-1H-1,4-benzodiazepine.
7. A method of effecting muscle relaxation comprising administering to a mammal exhibiting muscle spasticity, an amount effective to reduce muscle spasticity of a compound of the structural formula:

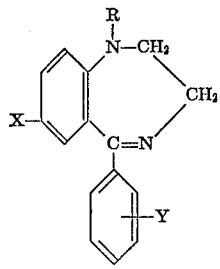

wherein X is a member of the group consisting of halogen, trifluoromethyl and nitro; Y is a member of the group consisting of hydrogen, halogen, trifluoromethyl, nitro, hydroxy, lower alkyl and lower alkoxy; and R is 2,2,2-trifluoroethyl; or the 4-N-oxide or a pharmaceutically acceptable acid addition salt thereof.

8. A method according to claim 7 wherein X is halogen.
9. A method according to claim 8 wherein Y is ortho-fluoro.
10. A method according to claim 8 wherein X is chloro.
11. A method according to claim 7 wherein Y is ortho-fluoro.
12. A method according to claim 11 where said compound is 7-chloro-2,3-dihydro-1-(2,2,2-trifluoroethyl)-5-(o-fluorophenyl)-1H-1,4-benzodiazepine.

References Cited
UNITED STATES PATENTS

| | | | |
|---|---|---|---|
| 3,131,178 | 4/1964 | Archer et al. | 260—239 |
| 3,429,874 | 2/1969 | Topliss | 260—239.3 |
| 3,523,939 | 8/1970 | Fryer et al. | 260—239.3 |
| 3,546,212 | 12/1970 | Felix et al. | 260—239.3 |
| 3,501,460 | 3/1970 | Kaegi | 260—239 |

STANLEY J. FRIEDMAN, Primary Examiner